United States Patent [19]
Crippen

[11] 3,742,913
[45] July 3, 1973

[54] AUTOMATIC FEEDING DEVICE FOR ANIMALS

[75] Inventor: Huston D. Crippen, Esmont, Va.

[73] Assignee: Coleswood Products, Inc., Esmont, Va.

[22] Filed: Mar. 8, 1972

[21] Appl. No.: 232,698

[52] U.S. Cl. .......................... 119/51.11, 119/56 R
[51] Int. Cl. ............................................. A01k 5/02
[58] Field of Search............... 119/52 AF, 51.11, 119/56 A, 56 R

[56] References Cited
UNITED STATES PATENTS

| | | | |
|---|---|---|---|
| 3,376,856 | 4/1968 | Crippen........................ | 119/52 AF |
| 1,359,691 | 11/1920 | Genuit...................... | 119/56 A UX |
| 3,547,081 | 12/1970 | Geerlings..................... | 119/51.11 |

Primary Examiner—Hugh R. Chamblee
Attorney—William E. Schuyler, Jr., Gene W. Stockman et al.

[57] ABSTRACT

A feeding device for automatically dispensing feed to animals at regular predetermined intervals comprising an activating unit which includes an upper feed material receiving hopper having baffle means mounted therein and a discharge opening at the bottom leading to a feed material measuring and dispensing compartment having a dispensing outlet at the bottom for discharging feed therefrom. Valve means are reciprocally operable to alternately open and close the discharge opening and the dispensing outlet. A rotating turntable having a cone-shaped dispersing means centrally thereof is positioned underneath the compartment to receive feed discharged therefrom and distributes the feed outwardly to a feed trough surrounding the turntable. A suitable timer mechanism is provided to automatically actuate the valve means and the turntable to dispense feed at regular predetermined intervals.

6 Claims, 5 Drawing Figures

PATENTED JUL 3 1973 3,742,913

AUTOMATIC FEEDING DEVICE FOR ANIMALS

BACKGROUND OF THE INVENTION

1. Field of the Invention

This invention relates generally to the field of animal feeding devices and more particularly to feeding devices for automatically delivering predetermined quantities of feed material to a plurality of animals at regular timed intervals.

2. Description of the Prior Art

There has long been a need for devices for automatically and conveniently dispensing feed materials such as pelletized feed to animals at regular predetermined intervals. Heretofore known prior art devices have encountered particular difficulty in handling particulate feed material due to the fact that the particles of the material tend to bridge or block various passageways and openings in the dispensing devices, thus preventing an efficient and effective dispensing of a desired amount of the feed material. Moreover, prior art devices designed to dispense particular feed material have often not been efficiently designed to simultaneously feed a plurality of animals. Other such prior art devices have been relatively complicated in construction and difficult to maintain and operate.

SUMMARY OF THE INVENTION

Description of the Prior Art

Among the objects of the present invention is to avoid the disadvantages of prior art feeding devices for dispensing particulate feed materials to animals and to provide an improved particulate material animal feeding device particularly adapted to reliably dispense predetermined quantities of feed at regular timed intervals to a plurality of animals.

A further object of the invention is to provide such a feeding device which is relatively simple in construction and yet contains means for preventing bridging of particulate feed material within the dispenser to insure accurate delivery of the feed material and to uniformly distribute the feed material to a plurality of animal feeding stations. It is another object of the invention to provide a feeding device dispensing feed to animals which includes a timing device for insuring that the feed is regularly and accurately dispensed at predetermined intervals.

According to the present invention, there is provided a feeding device for automatically dispensing feed to animals comprising a generally cylindrical body having an upper feed material receiving hopper with a discharge opening at the bottom thereof and a lower feed material measuring and dispensing compartment having a dispensing outlet at the bottom thereof. Valve means are reciprocally operable within the compartment between a non-dispensing position closing the outlet and a dispensing position closing the discharge opening in the hopper while leaving the outlet open. Suitable means such as a solenoid or an electrical motor and rack and pinion gear arrangement are provided to reciprocally operate the valve means. A rotating turntable operated by suitable motor means is positioned below the compartment and has a generally cone-shaped dispersing means centrally mounted thereon beneath the outlet of the compartment for dispersing outwardly feed discharged through the outlet. A circular feed trough is positioned around the turntable to receive the feed distributed therefrom all the way around in relatively equal amounts to permit the simultaneous feeding of a plurality of animals. Suitable timer means are provided to energize the means for operating the valve means and the rotating turntable to automatically dispense a predetermined quantity of feed at regular intervals.

BRIEF DESCRIPTION OF THE DRAWINGS

Other objects and advantages of the invention will become apparent by reference to the detailed description of the invention and the accompanying drawings which follow wherein.

DESCRIPTION OF THE INVENTION

Figure 1:
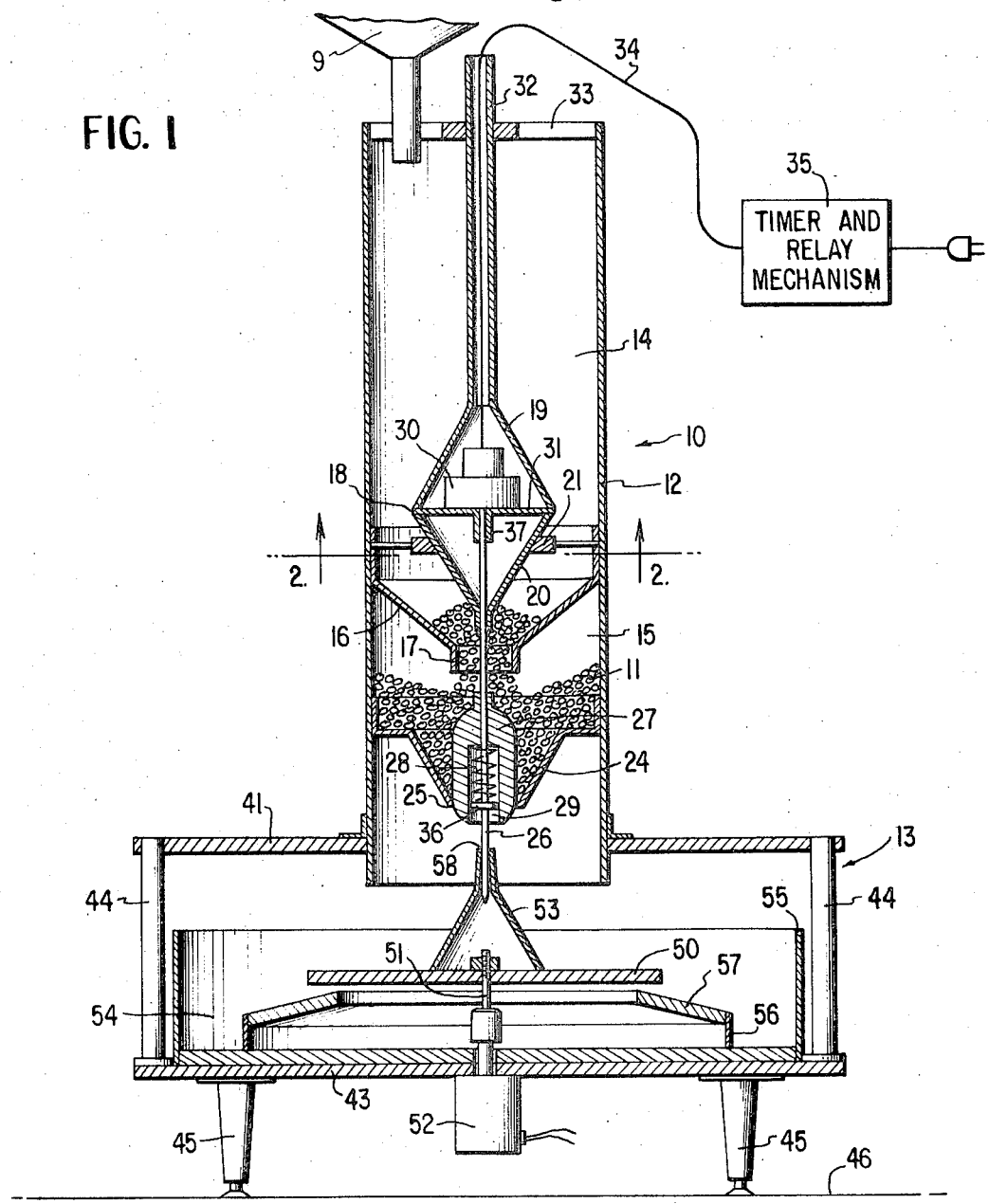
FIG. 1 is a cross-sectional front elevational view of an animal feeding device constructed according to the principles of the present invention.

Referring to the drawings, there is shown an animal feeding device, generally designated by the numeral 10, for automatically dispensing predetermined quantities of particulate feed materials 11 or the like at regular timed intervals. The feeding device 10 comprises a cylindrical body portion or activating unit 12 supported by a circular base portion 13. A main feed supply bin or hopper 9 supplies feed material to the feeding device 10. The bin 9 preferably is capable of storing a relatively large supply of feed and is supported independently of the feeding device 10.

Figure 2:
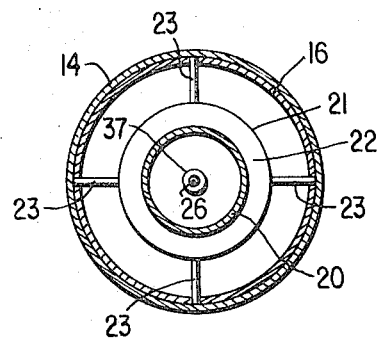
FIG. 2 is a cross-sectional view taken along line 2—2 of FIG. 1.

The upper body portion 12 is comprised of an upper feed material receiving hopper 14 and a lower feed measuring and dispensing compartment 15. The hopper 14 which preferably is cylindrical in configuration is provided at its bottom with a funnel 16 which is generally in the form of an inverted cone with its bottom walls slanting downwardly and inwardly and terminating in a discharge opening 17. Baffle means 18 are mounted in the hopper at a point spaced above the discharge opening 17. Preferably the baffle means 18 is comprised of an upper cone 19 and a lower inverted cone 20 supported by a retainer ring 21 attached to the upper part of funnel 16 and the walls of the hopper 14. As shown in FIG. 2, retainer ring 21 is comprised of a central disc 22 having an opening in the center thereof to receive and support the bottom inverted cone 20 of baffle means 18. The disc 22 in turn is supported by outwardly extending rods 23 attached to the upper part of funnel 16 and the walls of hopper 14.

Positioned below hopper 14 is the lower feed measuring and dispensing compartment 15 having a funnel 24 at the bottom thereof in the shape of an inverted cone having downwardly and inwardly sloping walls which terminate in a dispensing outlet 25.

Feed measuring and dispensing compartment 15 may be varied in size by raising or lowering the bottom funnel 24 with accommodating change in valve size. The device therefore may be adjusted so that the compartment 15 wil only hold a predetermined quantity of material.

Valve means are provided for alternately opening and closing discharge opening 17 and dispensing outlet 25. The valve means are comprised of a valve stem 26 having an elongated valve 27 towards the bottom thereof. The valve 27 is normally biased upwardly on the valve stem 26 by means of a spring 28 positioned around valve stem 26 and held in place by retainer 36 within an opening 29 extending upwardly from the bottom of the valve. The valve stem 26 extends from a point adjacent the bottom of body portion 12 up through dispensing outlet 25, valve 27, discharge opening 17, through an opening in the bottom of baffle means 18, and through a sleeve 37 for connection to a solenoid 30 positioned on a suitable supporting platform 31 on the interior of the baffle means 18. While the embodiment of FIGS. 1 through 4 shows a solenoid within baffle means 18 for operating the valve means, it will be appreciated that any other suitable means such as an electric motor having a rack and pinion gear arrangement connected therewith may be mounted within the baffle means 18 to reciprocally operate the valve means.

Extending upwardly from the upper cone 19 of baffle means 18 is a hollow tube 32 supported at the top of body 12 by a retainer ring 33. Tube 32 provides a convenient means for receiving an electrical cord 34 which supplies power to solnoid upon energization of a suitable timer and relay mechanisms 35.

The upper body portion 12 constitutes an activating unit for the feeding device 10 of the present invention. Thus, particulate feed material may be supplied from the main feed supply bin or hopper 9 directly into the upper feed material receiving hopper 14 of the body portion 12 until the hopper 14 is completely full. At this point, the feed material would abut against the bottom outlet of the main supply bin and automatically stop the flow of feed therefrom. It will be appreciated, of course, that as feed material is discharged from the bottom of the activating unit, an additional quantity of feed would automatically flow from the main supply bin 9 into the hopper 14.

As the feed passes down through receiving hopper 14, it is diverted to the side by the upper cone 19 of the baffle means 18. The upper cone 19 thus breaks up and distributes the feed material all around the hopper 14. As the feed material passes from upper cone 19, it flows downwardly in the hopper 14 where it contacts the funnel 16. The top edge of funnel 16 then initiates a reverse flow of feed by shunting feed directed outwardly by the upper cone 19 of baffle means 18 in an inward and downward direction between the surface of the lower cone 20 of the inclined conical surface of funnel 16. This reversal of direction tends to lessen the vertical pressure on the feed making it less susceptible to bridging.

The distance and the resultant area between the surface of the lower cone 20 of baffle means 18 and funnel 16 puts a limit on the volumetric flow of feed and the number of layers of feed gravitating towards the discharge opening 17 at any given time. This fact tends to hold friction to allowable tolerances through control of the weight represented by the upper layers of feed pressing on the bottom layer of feed which is in direct contact with the surface of funnel 16 and permits a form of controlled movement of feed to discharge opening 17 while still making the device less susceptible to bridging.

Funnel 16 in conjunction with the lower cone 20 of baffle means 18 directs feed in relatively even quantities around the periphery of discharge opening 17. Moreover, the downward movement of the feed as it approaches discharge opening 17 exerts an antibridging effect by tending to break up any blocks of feed which may exist on the edge of the discharge opening 17 by the movement of the descending feed itself.

Figure 3:
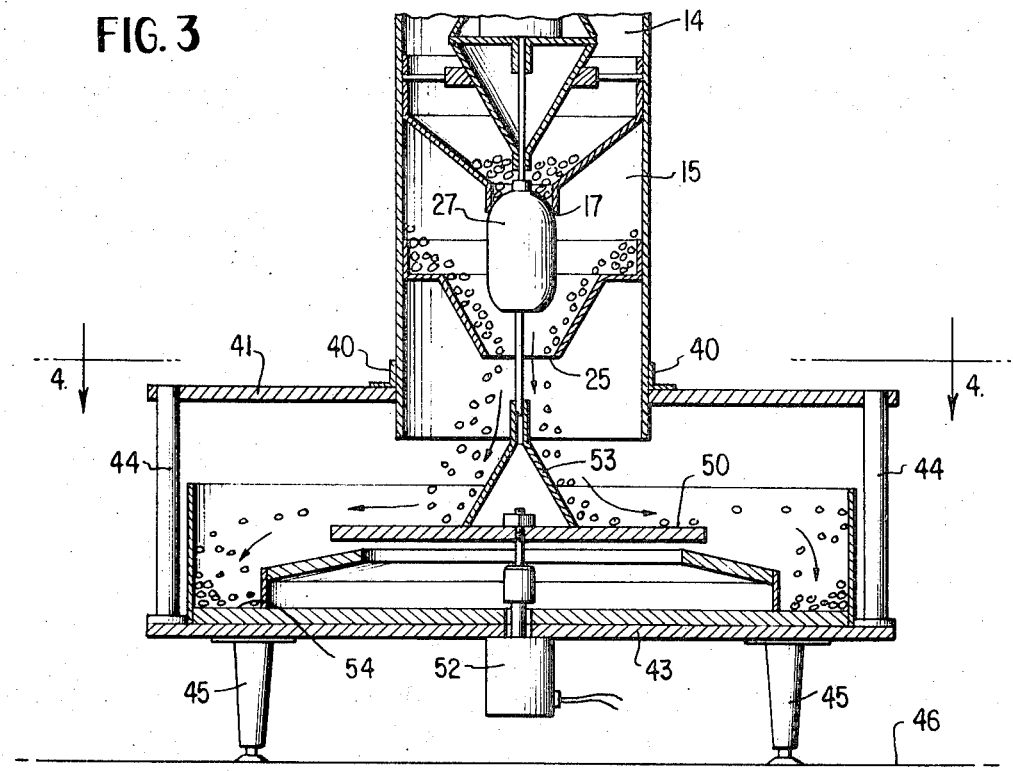
FIG. 3 is a partial cross-sectional front elevational view illustrating the valve of the present invention in a dispensing position.
Figure 4:
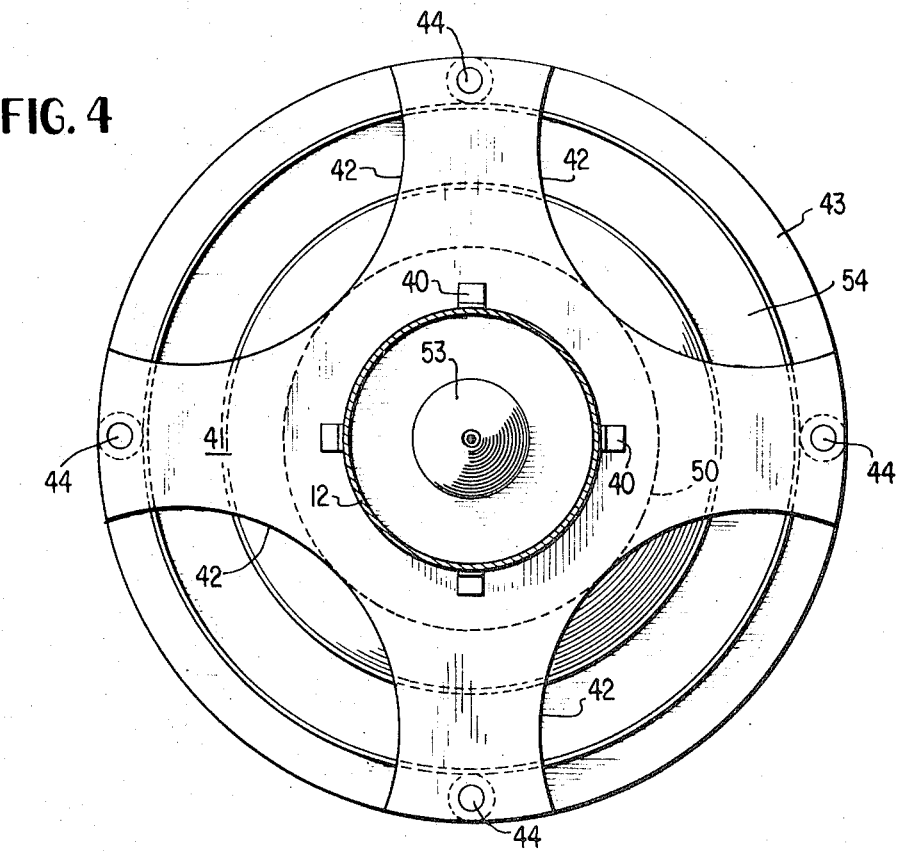
FIG. 4 is a cross-sectional view taken along line 4—4 of FIG. 3.

The body portion or activating unit 12 of the animal feeding device 10 of the present invention is generally supported by base portion 13. As shown in FIGS. 1, 3 and 4, the bottom part of body portion 12 is attached by any suitable means such as brackets 40 to the top wall 41 of the base portion 13. Top wall 41 may be either solid or provided with a plurality of cutout portions 42.

Top wall 41 is supported above bottom wall 43 by a plurality of columns or posts 44 extending between the top and bottom walls. Top wall 41 and bottom wall 43 are spaced a sufficient distance apart to permit animals such as cattle to extend their heads into feed from trough 54 all the way around. Top wall 41 also may be extended outwardly beyond the perimeter of bottom wall 43 to afford a covering for animals feeding at the trough 54.

Base portion 13 further may include a plurality of supports such as bottom legs 45 for positioning the bottom wall 43 a desired distance above the surface 46 upon which the feeding device rests. A suitable concrete support structure also may be utilized to support base 13. As best seen in FIG. 4, the entire base portion 13 is preferably circular in configuration.

Mounted centrally of bottom wall 43 is a rotating turntable 50. Turntable 50 is mounted on vertical drive shaft 51 extending upwardly through an opening in bottom wall 33. Suitable power means such as electrical motor 52 may be mounted underneath bottom wall 33 to provide power for rotating shaft 51 and turntable 50. Motor 52 is connected by a suitable electrical circuit with the timer and relay mechanism 35 to coordinate the rotation of the turntable 50 with operation of the valve 27 to a dispensing position whereby turntable 50 rotates when the valve is in a feed dispensing position.

Mounted on top of turntable 50 centrally thereof directly underneath dispensing outlet 25 is a generally cone-shaped dispersing means 53. As shown in FIG. 1, dispersing means 53 may be provided with an opening 58 on its upper end to receive the bottom of valve stem 26 to assist in supporting the valve stem. Alternatively, the valve stem may stop short of the dispersing means and terminate adjacent the end valve 27. The dispersing means 53, because of its cone shape, causes feed material dispensed from outlet 27 to be distributed outwardly on turntable 50.

Positioned around turntable 50 is a feeding trough 54 for receiving feed discharged from the turntable 50 and permitting a plurality of animals to be fed simultaneously. Feeding trough 54 is circular in configuration and is formed by a circular outer wall 55 extending upwardly from bottom wall 43 and a short circular inner wall 56, also extending upwardly from bottom wall 43. An intermediate circular shelf 57 may be attached to the top of inner wall 56 and preferably slants downwardly to form an inclined approach to feed trough 54 for feed distributd from turntable 50.

The operation of the device shown on FIGS. 1 through 4 will now be described. The upper hopper 14 is filled with a suitable particulate feed material 11 from bin 9 which, as it descends downwardly in the hopper, is broken up and distributed all around the hopper by the cone-shaped top of the baffle means 18 to prevent the particulate feed material from bridging or clogging within the hopper. From the baffle means 18 the feed material travels downwardly to the inclined sides of funnel 16 and down through discharge opening 17 when the valve 27 is in its non-dispensing position as shown in FIG. 1.

The feed material 11 discharged through opening 17 fills the feed measuring and dispensing compartment 15 until the feed material backs up to the bottom of the discharge opening 17 and of itself closes off flow of feed from discharge opening 17 as shown in FIG. 1. At this point feeding device is ready to dispense feed.

The timer and relay mechanism which may be of any conventional type is connected to a suitable source of electrical power and at a predetermined time interval automatically energizes the solenoid 30 causing valve stem 26 and consequently valve 27 to move upwardly until it seats in discharge opening 17 to stop the flow of feed therethrough. Movement of valve 27 upwardly also opens dispensing outlet 25 to permit the feed to be discharged therethrough down to the dispersing means 53. Since valve 27 operates between opening 17 and outlet 25, movement of the valve therein helps prevent feed material from clogging at and between these points. When the solenoid 30 is initially activated, the spring 28 within valve 27 permits the valve stem 26 to initially move upwardly while the valve remains temporarily relatively stationary. The spring 28 therefore initially is momentarily compressed against the valve 27, thus permitting the valve stem to move upwardly without correspondingly initially moving the valve against the feed material. Accordingly, less force is required by the solenoid initially to move the valve, thereby permitting the use of a lighter duty solenoid. After the initial upward movement of the valve stem 26, the compression force of the spring 28 assists in moving the valve upwardly against the feed material. Moreover, the spring provides sufficient play in the movement of the valve with respect to the stem to permit the valve to securely seat in discharge opening 17 without crushing any feed material.

The feed material then moves outwardly on rotating turntable 50 from where it is distributed across intermediate shelf 57 and into feed trough 54. It will be appreciated that the motor means 52 for rotating turntable 50 is energized by the timer and relay means 55 simultaneously with the energization of solenoid 30 so that turntable 50 is always in rotation by the time any feed material is dispensed through outlet 27 to the turntable. This insures that the feed will be distributed evenly all around feed trough 54 so that a plurality of animals such as cattle may be fed simultaneously and in relatively equal amounts.

Figure 5:
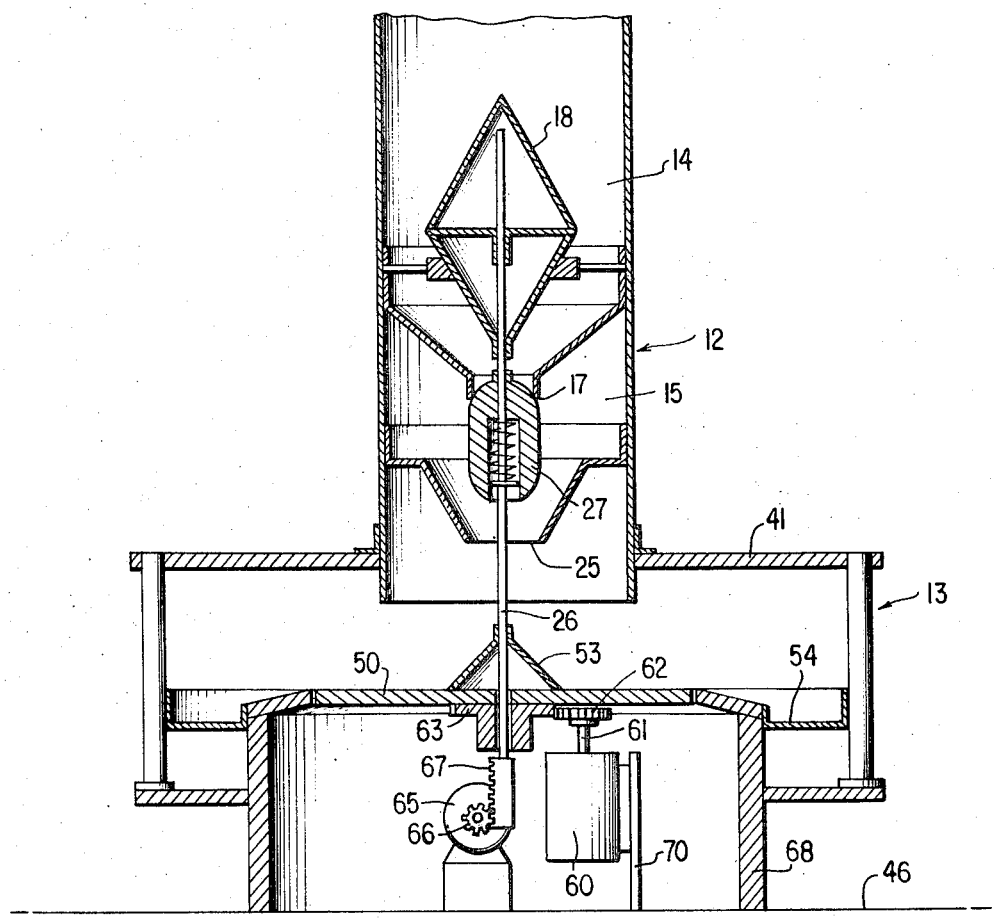
FIG. 5 is a cross-sectional front elevational view showing a further embodiment of the animal feeding device constructed according to the principles of the present invention.

A further embodiment of the present invention is shown in FIG. 5. It differs from the embodiment shown in FIGS. 1 through 4 primarily in the location and design of the valve operating means and the base portion. Referring to FIG. 5, the upper body portion or activating unit 12 is identical to that described in connection with the embodiment in FIGS. 1 through 4 except the baffle means 18 does not house the valve operating means. Body portion 12 is attached to top wall 41 the same as described with respect to the embodiment in FIGS. 1 through 4.

In the embodiment of FIG. 5, the turntable 50 is operated by an electrical motor means 60 having a drive shaft 61 extending upwardly therefrom with a drive gear 62 attached thereto. The gear 62 in turn meshes with a second gear 63 attached to the bottom of turntable 50. Motor 60 may be mounted on any suitable support means such as column 70.

The means for operating the valve stem 26 and valve 27 comprises a suitable electric motor 65 having a pinion gear 66 attached thereto which meshes with a gear rack 67 attached to the bottom of the valve stem 26 to reciprocate the valve 27 between a non-dispensing position closing outlet 25 and a dispensing position closing discharge opening 17. The means for operating the valve and the turntable are enclosed in a bottom enclosure 68 which rests on the surface 46 and which generally supports the remainder of the base portion 13.

The operation of the embodiment in FIG. 5 is similar to that described with respect to the embodiment in FIGS. 1 through 4 in that a suitable timer mechanism energizes the motors 60 and 65 to cause the valve 27 and the turntable 50 to operate whereby feed material dispensed through outlet 25 is distributed outwardly by the dispersing means 53 and rotating turntable 50 to an outer circular feed trough 54.

It is apparent that the animal feeding device of the present invention is particularly adapted to feed a plurality of animals simultaneously. Moreover, its simple construction permits automatic feeding of the animals with no maintenance or supervision necessary other than to insure that the hopper is at all times supplied with a sufficient amount of feed.

It is to be understood that the invention is not limited to the particular embodiments described and shown herein and that it includes any modifications or equivalents within the scope of the appended claims.

I claim:

1. A feeding device for dispensing feed to animals comprising an upper feed material receiving hopper having a discharge opening at the bottom thereof, a feed material measuring and dispensing compartment disposed beneath said opening and having a dispensing outlet for discharging feed therefrom, valve means reciprocally operable between a non-dispensing position closing said outlet while permitting said compartment to be filled with feed to be dispensed from said hopper and a dispensing position closing said opening while permitting feed to be discharged from said compartment through said outlet, means for reciprocally operating said valve means, a rotating turntable positioned below said compartment, means for rotating said turntable to cause feed on said turntable to be distributed outwardly, and in relatively even amounts around the perimeter, a generally cone-shaped dispersing means mounted above said turntable and beneath said outlet for dispersing outwardly feed discharged through said outlet, and a feed trough positioned around said turntable to receive feed distributed therefrom.

2. A feeding device as defined in claim 1 wherein said hopper is cylindrical and includes baffle means mounted therein having a generally cone-shaped upper configuration to break up the flow of feed through said hopper.

3. A feeding device as defined in claim 2 wherein said baffle means defines a hollow interior space and said means for operating said valve means is mounted in said interior space.

4. A feeding device as defined in claim 1 wherein said means for operating said valve means comprises a solenoid.

5. A feeding device as defined in claim 1 wherein said means for operating said valve means comprises an electric motor and a rack and pinion gear arrangement.

6. A feeding device as defined in claim 1 which includes electrical timer means for automatically controlling the energization of said means for operating said valve means and the energization of said means for rotating said turntable to automatically dispense feed at predetermined intervals.

* * * * *